US010126208B2

(12) United States Patent
Bianchi et al.

(10) Patent No.: US 10,126,208 B2
(45) Date of Patent: Nov. 13, 2018

(54) SENSOR SYSTEM HAVING A SENSOR SUPPORTED BY A MAST FOR USE WITHIN FLUID FLOWS

(71) Applicant: ROLLS-ROYCE plc, London (GB)

(72) Inventors: Stefano Bianchi, Derby (GB); Howoong Namgoong, Derby (GB)

(73) Assignee: ROLLS-ROYCE plc, London (GB)

( * ) Notice: Subject to any disclaimer, the term of this patent is extended or adjusted under 35 U.S.C. 154(b) by 134 days.

(21) Appl. No.: 15/287,459

(22) Filed: Oct. 6, 2016

(65) Prior Publication Data
US 2017/0115183 A1 Apr. 27, 2017

(30) Foreign Application Priority Data

Oct. 22, 2015 (GB) .................................. 1518712.3

(51) Int. Cl.
G01M 15/14 (2006.01)
G01F 15/18 (2006.01)
G01F 1/684 (2006.01)
F01D 17/08 (2006.01)
G01P 5/02 (2006.01)
(Continued)

(52) U.S. Cl.
CPC ............ G01M 15/14 (2013.01); F01D 17/08 (2013.01); G01F 1/684 (2013.01); G01F 15/18 (2013.01); G01P 5/02 (2013.01); G01P 5/10 (2013.01); G01P 5/12 (2013.01)

(58) Field of Classification Search
USPC ...................................................... 73/112.01
See application file for complete search history.

(56) References Cited

U.S. PATENT DOCUMENTS 3,474,669 A 10/1969 Carter et al.
5,104,287 A * 4/1992 Ciokajlo ................. F01D 11/22
415/126
(Continued)

FOREIGN PATENT DOCUMENTS

EP 1 491 900 A2 12/2004
EP 1 615 002 A1 1/2006
(Continued)

OTHER PUBLICATIONS

Mar. 10, 2017 Search Report issued in European Patent Application No. 16192528.
(Continued)

Primary Examiner — Eric S McCall
(74) Attorney, Agent, or Firm — Oliff PLC

(57) ABSTRACT

A sensor system includes a sensor and a mast on which the sensor is mounted. The mast includes a core body and a shroud, wherein the shroud is provided about the core body, and the shroud is independently rotatable with respect to the core body under the influence, in use, of a fluid flow flowing past the shroud. The shroud is shaped so that, from at least one fluid flow direction, the shroud presents a different flow resistance in dependence upon the rotational orientation of the shroud. The rotational orientation of the shroud adjusts to reduce the flow resistance produced by the shroud to the fluid flow in response to the commencement of, or a change in the fluid flow direction to, one of the at least one fluid flow direction.

14 Claims, 4 Drawing Sheets

(51) Int. Cl.
    *G01P 5/10*     (2006.01)
    *G01P 5/12*     (2006.01)

(56) References Cited

U.S. PATENT DOCUMENTS

| | | | | |
|---|---|---|---|---|
| 5,365,663 A | * | 11/1994 | Demartini | G01H 1/006 29/889.2 |
| 5,947,679 A | * | 9/1999 | Cybularz | F03B 3/06 415/13 |
| 2011/0070068 A1 | * | 3/2011 | Cumings | F03D 3/0481 415/30 |
| 2016/0146100 A1 | * | 5/2016 | Sun | F02B 37/24 415/1 |

FOREIGN PATENT DOCUMENTS

| | | |
|---|---|---|
| FR | 3 025 885 A1 | 3/2016 |
| WO | 0167115 A2 | 9/2001 |

OTHER PUBLICATIONS

May 9, 2016 Search Report issued in British Patent Application No. 1518712.3.

* cited by examiner

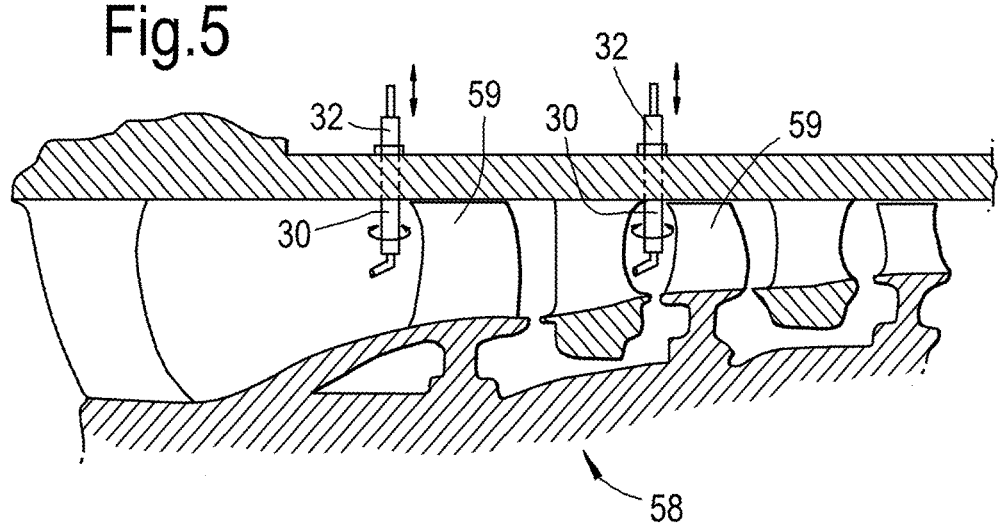
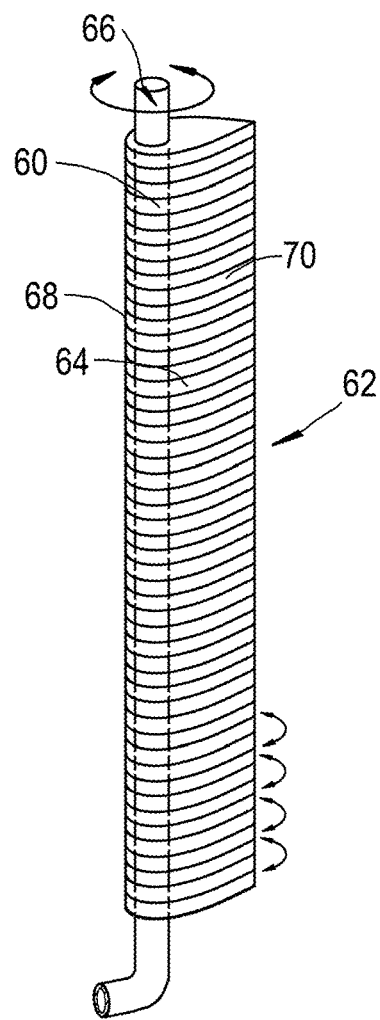

SENSOR SYSTEM HAVING A SENSOR SUPPORTED BY A MAST FOR USE WITHIN FLUID FLOWS

BACKGROUND

The present disclosure concerns sensor systems and test rigs comprising sensor systems. More specifically the invention concerns sensors supported in use within fluid flows via masts. The disclosure may have particular application in the field of gas turbine engines where sensors may be supported in an airflow and measurements taken indicative of component and/or system performance during testing and/or operation. The disclosure is not however limited to such applications and it will be appreciated that the disclosure may be applicable to other systems where sensed information is required from a fluid flow region and/or where a mast supporting a sensor is required to pass through a fluid flow region. By way of example the disclosure may be applicable to the taking of sensor measurements via a mast extending into a ducted liquid flow or in any other submerged environment via a mast, antenna, probe or similar. Similarly the disclosure may be applicable where a sensor is positioned on a mast, antenna, probe or similar that is subjected to an air flow.

For convenience the following background is provided in the context of sensors used in gas turbine engines, but this is not intended to be limiting.

When measuring the performance of gas turbine engine components and/or broader systems of the gas turbine engine it is sometimes desirable to take sensor measurements in an airflow region. Such measurements may be taken during rig tests (e.g. to test the performance of a new fan design) or pass of testing, but may also be performed during normal in-service operation (e.g. for engine health monitoring or engine control purposes).

An example of such measurement taking often performed during fan rig testing is the collection of flow velocity and turbulence data downstream of the fan blades. A 'hot-wire' anemometer sensor is positioned in the air flow, downstream of the fan blades, via an elongate probe extending through an access opening in a fan case surrounding the fan. The anemometer is used to scan the flow velocity field moving in the blade span-wise direction. The velocity field behind the fan is important for the analysis of fan outlet guide vane and engine section stator interaction noise and performance. The 'hot-wire' is exposed to the flow and the resistance of the wire changes due to the convection heat transfer by the flow. It has been found however that vibration and buffeting of the elongate probe adversely impacts on the accuracy of the sensor readings. The motion of the sensor contributes to the flow velocity values measured. The adverse effect increases in severity as a longer length of probe is exposed to the air flow (i.e. as the sensor is moved ever further in towards the roots of the fan blades).

SUMMARY

According to a first aspect there is provided a sensor system comprising a sensor and a mast on which the sensor is mounted, the mast optionally comprising a core body and optionally a shroud, whereby the shroud is optionally provided about the core body and the shroud is optionally rotatable with respect to the core body optionally under the influence, in use, of a fluid flow flowing past the shroud, and where further the shroud is optionally shaped so as, optionally from at least one fluid flow direction, it optionally presents a different flow resistance in dependence upon its rotational orientation, optionally such that the rotational orientation of the shroud adjusts to reduce the flow resistance produced by the shroud to the fluid flow in response to the commencement of, or a change in the fluid flow direction to, one of the at least one fluid flow directions. Passive rotation of the shroud in the fluid flow may allow a reduced flow resistance to be maintained for a non-cylindrical shroud regardless of variations in the direction of the fluid flow. A non-cylindrical shroud may be advantageous in reducing drag and combating particular aerodynamic effects contributing to vibration and buffeting experienced by the mast which may negatively impact on the accuracy of readings from the sensor.

In some embodiments the sensor system further comprises a duct in which the sensor is positioned and through which in use the fluid flow is passed.

In some embodiments the largest dimension of the mast extends in a longitudinal direction between proximal and distal ends thereof. The mast may be adapted to be secured to the duct at or adjacent its proximal end. The sensor may be provided at or adjacent the distal end.

In some embodiments the distal end of the mast is free. More specifically it may be that the only support provided for the sensor and mast is provided at or adjacent the proximal end of the mast.

In some embodiments the axis of rotation of the shroud is parallel to the longitudinal direction. More specifically the core body may be cylindrical, with the cylinder axis and axis of rotation of the shroud being common. This may be advantageous where it is anticipated that the predominant fluid flow direction will be substantially perpendicular to the longitudinal direction.

In some embodiments the shroud has a curved leading edge. Specifically the leading edge may be a circular arc.

In some embodiments the shroud has an aerofoil shape. Use of an aerofoil shape may reduce vortex shedding from the shroud as fluid flows past it. This in turn may reduce vibration induced in the mast.

In some embodiments the shroud has a symmetrical aerofoil shape.

In some embodiments a chord of the shroud is substantially perpendicular to its axis of rotation.

In some embodiments a bearing is provided between the core body and the shroud. The bearing may allow for low resistance rotation and/or unrestricted relative rotation of the shroud and core body.

In some embodiments the shroud extends for substantially the full length of the mast. Such a shroud may provide a relatively simple solution to reducing flow resistance for the whole of the mast.

In some embodiments the mast comprises a plurality of the shrouds that are independently rotatable. A plurality of independently rotatable shrouds may allow improved shroud alignment to local fluid flow direction and may therefore further reduce overall fluid flow resistance. The shrouds may be formed as adjacent discs which may extend for substantially the full length of the mast.

In some embodiments a shroud alignment system is provided that selectively rotates the shroud to align it in a particular orientation relative to the core body and/or the duct. As will be appreciated, where there are a plurality of shrouds the shroud alignment system may align the shrouds in the same orientation with respect to the core and/or duct. The option to selectively align the shroud(s) in a known orientation may assist with removal of the shroud and core body combination from the duct through an aperture in the duct that is shaped to accommodate the shroud in only one or a narrow range of orientations. This in turn may allow the duct aperture to be smaller and therefore less likely to interfere with any testing undertaken.

The shroud alignment system might comprise a pneumatic system. This might for example comprise a hollow chamber within the shroud, a gas delivery passage passing through the core body and an outlet through an exterior wall of the core body in fluid communication with the hollow chamber. The outlet may be shaped to deliver different quantities of gas at different circumferential positions about the core body. In this way the hollow chamber (and therefore the shroud) may be aligned about the outlet where the passage is used to supply pressurised gas to the hollow chamber. By way of alternative example the shroud alignment system could be electromagnetically based, comprising a selectively activatable electromagnet in the core body and a magnetically susceptible region in the shroud. In this way activation of the electromagnet may cause the magnetically susceptible region (and therefore the shroud) to rotate for best alignment within the magnetic field of the electromagnet. As will be appreciated either system may be applied to an embodiment comprising a plurality of independently rotatable shrouds. In the case of the pneumatic system the passage may comprise multiple such outlets each in fluid communication with the hollow chamber of a different shroud. In the case of the electromagnetic system, each shroud may have such a magnetically susceptible region within range of the magnetic field of the electromagnet so as alignment of all shrouds is possible.

In some embodiments the sensor is mounted on the core body. This may be preferable to mounting the sensor on the shroud, rotation of which may detrimentally impact on the accuracy of readings from the sensor. Transmission conduits (e.g. for power to and signals from and/or to the sensor) may be provided through the core body. The sensor might for example be part of an electric circuit, with current being delivered to it via wires provided in the core body.

In alternative embodiments the sensor may be mounted on the shroud. This may be advantageous where repositioning of the sensor in accordance with the fluid flow direction is desirable. As will be appreciated multiple sensors may be provided at various locations on the shroud or in the case of a plurality of shrouds, a sensor or sensors may be provided on one, some or all of the shrouds.

The sensor system may be arranged for temporary insertion into a flow path, allowing for selective removal therefrom. The sensor system may for instance be used on a rig used during the design and/or testing of components/systems or during pass off testing. Alternatively the sensor system may be arranged as a permanent fixture in a flow path of a component/system. In such instances it may be that the sensor system is present during normal operational use of the component/system.

In some embodiments the fluid flow is gaseous and may be air.

In some embodiments the sensor system is arranged for use in a gas turbine. The duct may for instance be an intake duct, bypass duct, or core duct of the gas turbine engine. The mast may extend from an inner or outer wall or the duct and may extend radially into the duct. Specific exemplary gas turbine engine applications are:
 a) An engine section stator comb rake of a gas turbine engine. During test, these measure temperature and pressure downstream of engine section stators.
 b) A hot-wire anemometer used to measure flow velocity and turbulence downstream of fan blades. The sensor may be inserted through an access opening in a fan case and positioned within the fan duct. The mast may then be affixed to the fan case at its proximal end.

According to a second aspect there is provided a gas turbine engine comprising the sensor system of the first aspect.

According to a third aspect there is provided a test rig comprising the sensor system of the first aspect. The test rig may be a gas turbine engine test rig or a gas turbine engine component test rig.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 5 is a cross-sectional view showing a test rig in accordance with an embodiment of the invention;

FIG. 6 is a perspective view showing an alternative mast of a sensor system in accordance with embodiments of the invention;

DETAILED DESCRIPTION OF EMBODIMENTS

Figure 1:
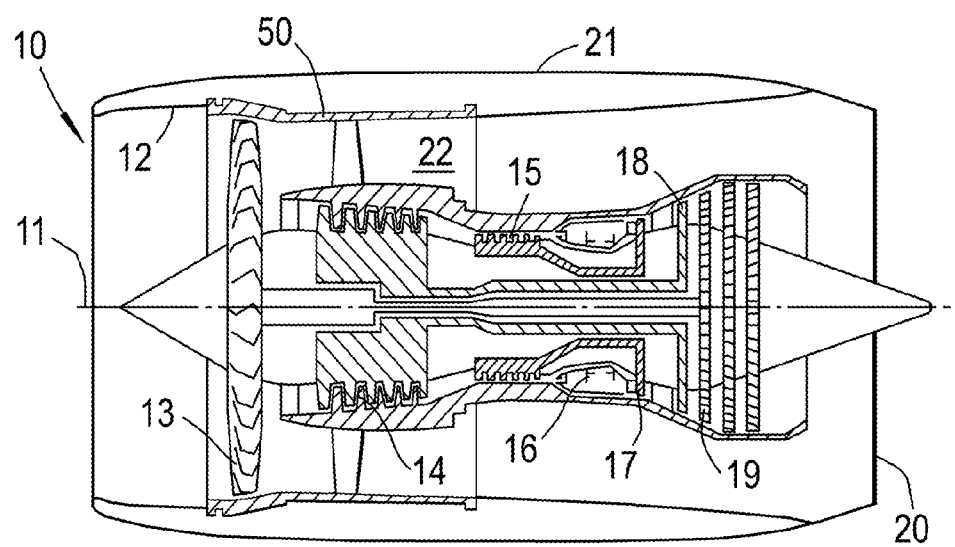
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
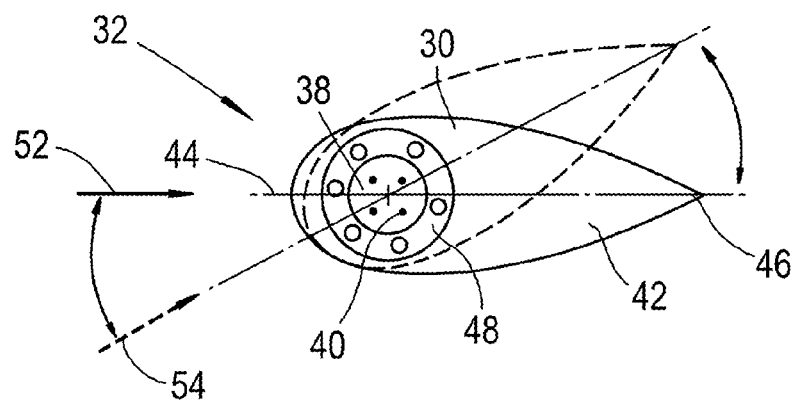
FIG. 2 is a cross-sectional top view of a mast in accordance with embodiments of the invention.
Figure 4:
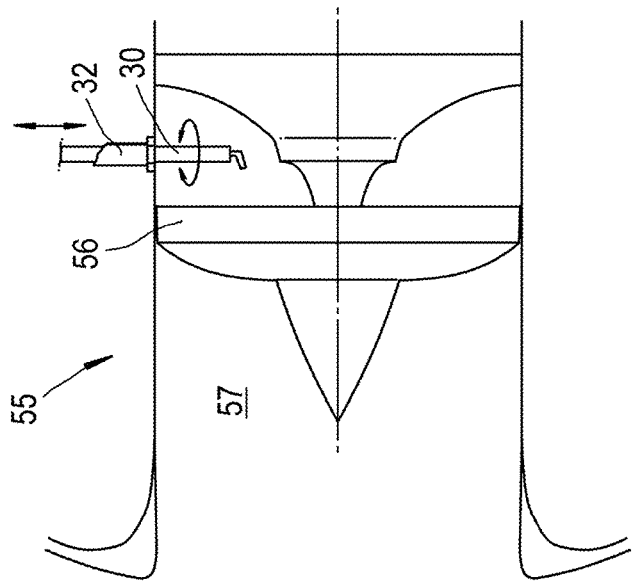
FIG. 4 is a cross-sectional view showing a test rig in accordance with an embodiment of the invention.
Figure 3:
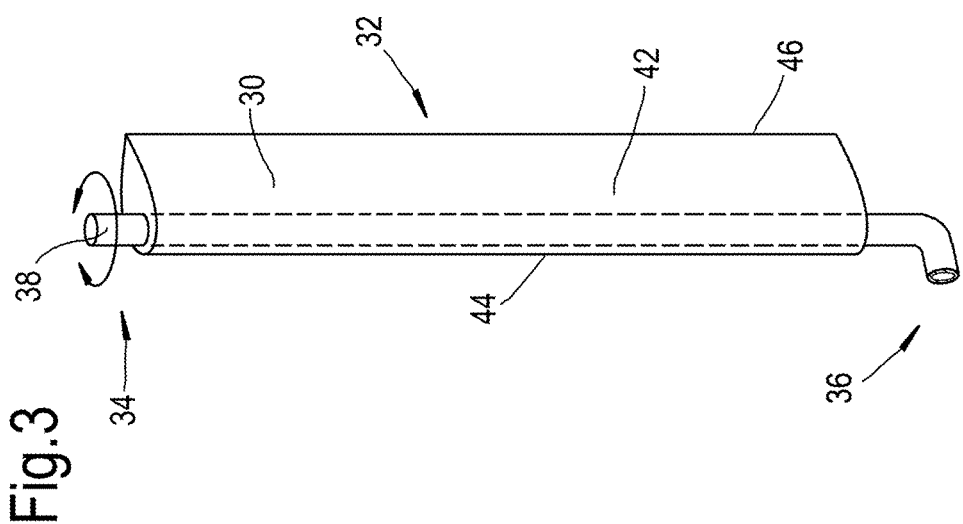
FIG. 3 is a perspective view showing the mast of FIG. 2.

Referring now to FIGS. 2 to 4, sensor system arrangements suitable for use in the gas turbine engine 10 are discussed. Such sensor systems may for instance be employed to measure air flow velocity and turbulence in the bypass duct 22 behind the fan 13.

Referring first to FIGS. 2 and 3 a mast 30 of a sensor system 32 is shown. The mast 30 is elongate, with its largest dimension extending in a longitudinal direction between proximal 34 and distal 36 ends of the mast 30. In use a sensor, in this case a hot wire anemometer (not shown), is provided at the distal end 36 of the mast 30 attached to a core body 38 of the mast 30. The core body 38 is formed as a cylindrical rod which acts as a skeleton of the mast 30 and extends for its full length. Embedded within the core body 38 are wires 40 forming part of an electrical circuit by which current is passed through the hot wire anemometer.

Surrounding the core body 38 and extending for substantially the full length of the mast 30 is a shroud 42. The shroud 42 is shaped as a symmetrical aerofoil having a leading edge 44 and a trailing edge 46. The leading edge 44 has a curved arc shape.

Between the core body 38 and shroud 42 is a bearing 48 arranged to allow free rotation of the shroud 42 about the core body 38. The cylinder axis of the core body 38 and axis of rotation of the shroud 42 are common. Further a chord of the shroud 42 between its leading 44 and trailing 46 edges is perpendicular to its axis of rotation.

In use the mast 30 is inserted into the bypass duct 22 through an access opening (not shown) in a fan case 50 of the gas turbine engine 10. The mast 30 is inserted so that it extends radially inwards across the bypass duct 22 and immediately downstream of the fan 13. The mast 30 does not span the full radial extent of the bypass duct 22 and so its distal end 36 is free. The mast 30 is secured to the fan case 50 at its proximal end 34 via a suitable fixing (not shown). When the fan 13 is operated a current is passed through the wires 40 and hot wire anemometer (not shown). As air flow forced by the fan 13 passes the hot-wire, the resistance of the wire changes due to the convection heat transfer by the flow. The variations in current flow allow measurement of the flow velocity and of the turbulence (i.e. flow velocity fluctuation).

As will be appreciated the flow of air generated by the fan is substantially and predominantly perpendicular to the axis of rotation of the shroud 42 and substantially parallel to chords thereof. Thus the air flow tends to flow over the shroud 42 from its leading edge 44 to its trailing edge 46. If at any given time the shroud 42 is misaligned with the air flow direction so as it has an angle of attack with respect thereto, the symmetric aerofoil shape of the shroud 42 means that its resistance to that flow will be increased. Because however the shroud 42 is free to rotate about the core body 38, it will rotate in order to reduce its resistance to the flow direction such that it is substantially aligned therewith. With specific reference to FIG. 2 a first air flow direction is indicated by arrow 52, with the rotational orientation consequently adopted by the shroud 42 shown in solid lines. A second air flow direction is indicated by arrow 54, with the consequent and different rotational orientation adopted by the shroud 42 shown in broken lines. As will be appreciated the second air flow direction 54 might for example prevail after the first air flow direction 52. In view of the shroud 42 presenting a different flow resistance in dependence upon its rotational orientation and its freedom to rotate to reduce its flow resistance, the change to the second air flow direction 52 will elicit the rotation of the shroud 42 so that it is aligned therewith, thereby reducing its resistance to the prevailing air flow direction. Furthermore, because the shroud is aerofoil shaped, flow shedding is reduced by comparison with alternative shroud shapes.

The combination of the reduction in flow shedding and the reduction in flow resistance produced by the aerofoil shape of the shroud and its alignment with the prevailing air flow direction reduces vibration and buffeting of the mast 30. This in turn may lead to more accurate measurements in terms of flow velocity and turbulence recorded by the hot-wire anemometer.

Where measurement of the flow velocity and turbulence is desired at an alternative radial position, the mast may be extended or retracted as appropriate.

Whilst the embodiment of FIGS. 2 and 3 has been described in the context of use in a fully assembled gas turbine engine 10, it will be appreciated that the embodiment might equally be used in the same manner in the context of a rig test for a fan suitable for use in a gas turbine engine. By way of example FIG. 4 shows a rig 55 arranged for testing a gas turbine engine fan 56. The sensor system 32 is provided as part of the rig 55, with the mast 30 positioning the sensor in a duct 57 of the rig 55 at a position immediately downstream of the fan 56. By way of further example FIG. 5 shows a rig 58 arranged for testing a gas turbine engine turbine. Two sensor systems 32 are provided as part of the rig 58, with each mast 30 of each sensor system 32 positioning a sensor immediately downstream of the rotors 59 of respective turbine stages.

Referring now to FIG. 6 an alternative mast 60 of another sensor system 62 is shown. The difference between the mast 60 and the mast 30 is in the configuration of the shroud. In the mast 60 a plurality of disc like shrouds 64 are provided instead of one single shroud. The shrouds 64 surround a core body 66 of the mast 60 and between them extend for substantially the full length of the mast 60. Each shroud 64 is shaped as a symmetrical aerofoil having a leading edge 44 and a trailing edge 46. The leading edge 44 has a curved arc shape.

Between the core body 66 and each shroud 64 is a bearing (not shown) arranged to allow free rotation of the shroud 64 about the core body 66. Each shroud 64 is independently rotatable with respect to the other shrouds 64. A cylinder axis of the core body 66 and axis of rotation of each shroud 64 is common. Further a chord of each shroud 64 between a leading 68 and trailing 70 edge thereof is perpendicular to its axis of rotation.

In use the shrouds 64 function in the same way as the shroud 42, to reduce vibration and buffeting which might otherwise adversely impact on the measurement accuracy produced by the hot wire anemometer. Because however each of the shrouds 64 are independently rotatable, they are better able to align with the air flow direction local to them. As will be appreciated the prevailing air flow may vary somewhat along the length of the mast 60 and the shrouds 64 may therefore produce improved vibration and buffeting reduction by comparison with the embodiment of FIGS. 2 and 3.

Figure 7:
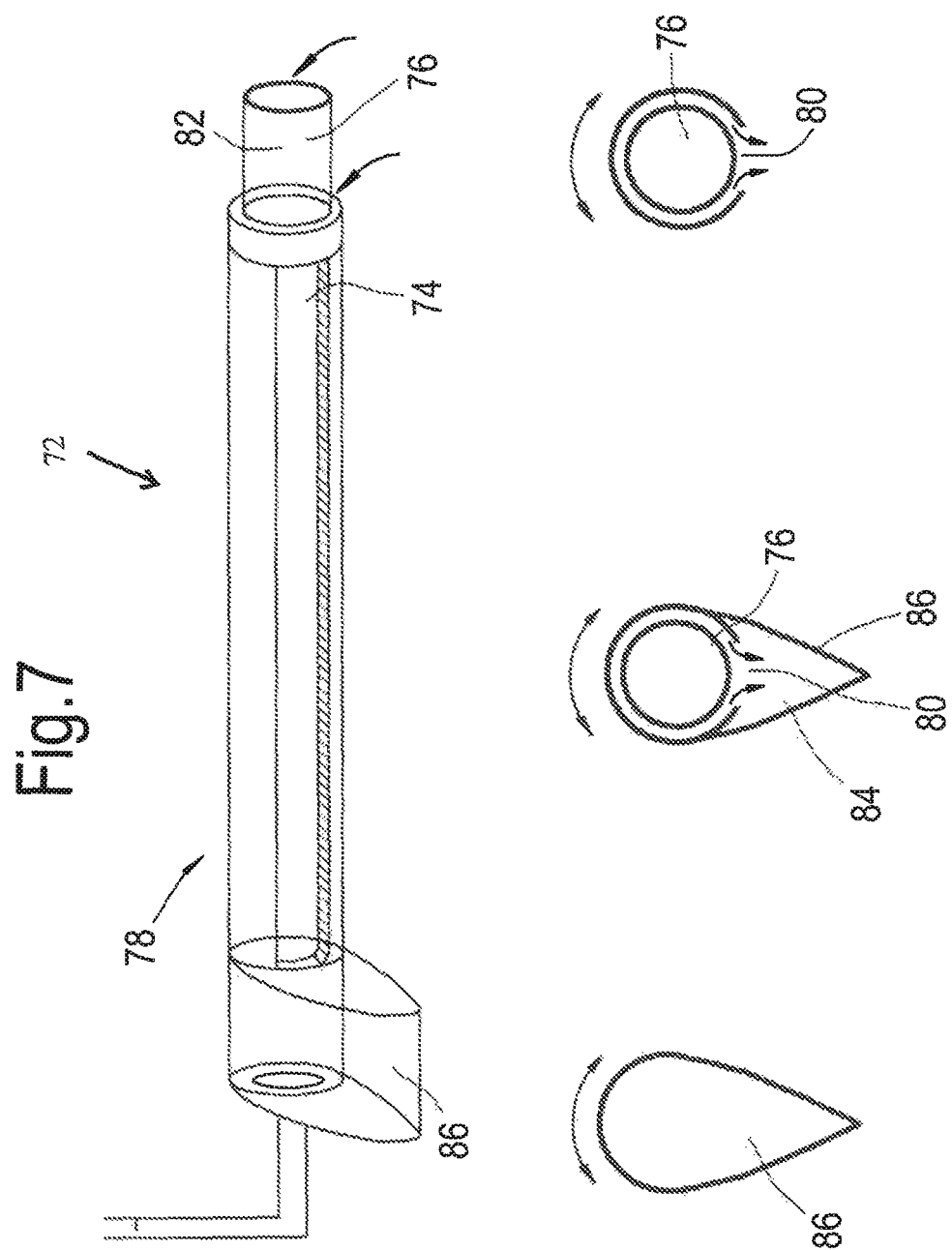
FIG. 7 provides views of a shroud alignment system in accordance with embodiments of the invention.

Referring now to FIG. 7 an exemplary shroud alignment system is described in the context of implementation in a sensor system similar to sensor system 32. As will be appreciated however a similar system 72 may also be applied to sensor system 62. The shroud alignment system 72 is pneumatically based and comprises a gas delivery passage 74 passing through a core body 76 of a sensor system 78. An outlet 80 from the fluid delivery passage 74 passes through an exterior wall 82 of the core body 76 and provides fluid communication between the gas delivery passage 74 and a chamber 84 inside of a shroud 86 of the sensor system 78. The outlet 80 is centred around one circumferential location about the core body 76 and has a limited circumferential extent. In use, the sensor system 78 of the shroud 86 (and therefore the centre of its chamber 84) may, through rotation of the shroud 86 about the core body 76, become somewhat misaligned with the centre of the outlet 80. In this case, it is possible to re-align the shroud 86 with respect to the core body 76 by delivering pressurised gas to the chamber via the gas delivery passage 74 and outlet 80. This will bring the shroud 86 into a known orientation relative to the core body 76, which may have been selected to allow removal of the whole sensor system 78 from a duct through an aperture in the duct that is shaped to accommodate the shroud 86 in only one or a narrow range of orientations.

Where the system 72 is to be applied to a sensor system in the style of that shown in FIG. 6, each shroud may be provided with a chamber, and there may be a series of circumferentially aligned outlets from the gas delivery passage one or more such outlet being provided at a location corresponding to the axial location of a respective chamber. Alternatively one or more extended outlets may be provided having portions respectively corresponding to a plurality of the chamber axial locations.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A sensor system comprising:
a sensor; and
a mast on which the sensor is mounted, the mast including:
a core body, and
a plurality of shrouds, wherein:
each of the plurality of shrouds is provided about the core body and each of the plurality of shrouds is independently rotatable with respect to the core body under the influence, in use, of a fluid flow flowing past the plurality of shrouds, and
each of the plurality of shrouds is shaped so that, from at least one fluid flow direction, each of the plurality of shrouds presents a different flow resistance in dependence upon a rotational orientation of the respective shroud, such that the rotational orientation of the shroud adjusts to reduce the flow resistance produced by the respective shroud to the fluid flow in response to the commencement of, or a change in the fluid flow direction to, one of the at least one fluid flow direction.

2. The sensor system according to claim 1, wherein each of the plurality of shrouds has an aerofoil shape.

3. The sensor system according to claim 1, wherein a chord of each of the plurality of shrouds is substantially perpendicular to an axis of rotation of the respective shroud.

4. The sensor system according to claim 1, wherein a bearing is provided between the core body and the plurality of shrouds.

5. The sensor system according to claim 1, wherein the plurality of shrouds extend for substantially the full length of the mast.

6. The sensor system according to claim 1, wherein the sensor is mounted on the core body.

7. The sensor system in accordance with claim 1, wherein:
the core body has a proximal end and an opposite distal end that define a length of the mast,
the proximal end of the core body extends from a first one of the plurality of shrouds and the distal end of the core body extends from a second one of the plurality of shrouds that is furthest from the first one of the plurality of shrouds, and
the sensor is provided at a portion of the distal end that extends from the second one of the plurality of shrouds.

8. The sensor system in accordance with claim 1, further comprising a duct in which the sensor is positioned and through which, in use, the fluid flow is passed.

9. The sensor system in accordance with claim 8, wherein the largest dimension of the mast extends in a longitudinal direction between proximal and distal ends of the mast, the mast being adapted to be secured to the duct at or adjacent the proximal end.

10. The sensor system according to claim 9, wherein the sensor is provided at or adjacent the distal end.

11. The sensor system according to claim 9, wherein the distal end of the mast is a free end.

12. The sensor system according to claim 9, wherein the axis of rotation of each of the plurality of shrouds is parallel to the longitudinal direction.

13. A gas turbine engine comprising a sensor system including:
a sensor; and
a mast on which the sensor is mounted, the mast including:
a core body, and
a plurality of shrouds, wherein:
each of the plurality of shrouds is provided about the core body and each of the plurality of shrouds is independently rotatable with respect to the core body under the influence, in use, of a fluid flow flowing past the plurality of shrouds, and
each of the plurality of shrouds is shaped so that, from at least one fluid flow direction, each of the plurality of shrouds presents a different flow resistance in dependence upon a rotational orientation of the respective shroud, such that the rotational orientation of the shroud adjusts to reduce the flow resistance produced by the respective shroud to the fluid flow in response to the commencement of, or a change in the fluid flow direction to, one of the at least one fluid flow direction.

14. A test rig comprising a sensor system including:
a sensor; and
a mast on which the sensor is mounted, the mast including:
a core body, and
a plurality of shrouds, wherein:
each of the plurality of shrouds is provided about the core body and each of the plurality of shrouds is independently rotatable with respect to the core body under the influence, in use, of a fluid flow flowing past the plurality of shrouds, and each of the plurality of shrouds is shaped so that, from at least one fluid flow direction, each of the plurality of shrouds presents a different flow resistance in dependence upon a rotational orientation of the respective shroud, such that the rotational orientation of the shroud adjusts to reduce the flow resistance produced by the respective shroud to the fluid flow in response to the commencement of, or a change in the fluid flow direction to, one of the at least one fluid flow direction.

* * * * *